United States Patent [19]
Hobin et al.

[11] Patent Number: 5,591,333
[45] Date of Patent: Jan. 7, 1997

[54] MODULAR SHORELINE OIL SPILL BARRIER ASSEMBLY

[75] Inventors: Michael P. Hobin, Basking Ridge, N.J.; Milo Johnston, Doylestown, Pa.; Mark Johnson, Montclair; John Clement, Green Brook, both of N.J.

[73] Assignee: Sorbent Products Co., Inc., Somerset, N.J.

[21] Appl. No.: 394,363

[22] Filed: Feb. 24, 1995

[51] Int. Cl.⁶ .................................................. E02B 15/06
[52] U.S. Cl. .................. 210/242.4; 210/924; 405/72
[58] Field of Search ............................ 210/242.4, 924; 405/63, 72

[56] References Cited

U.S. PATENT DOCUMENTS

| | | | |
|---|---|---|---|
| 3,667,235 | 6/1972 | Preus et al. | 210/242.4 |
| 3,770,626 | 11/1973 | Ayers | 210/242.4 |
| 4,062,191 | 12/1977 | Preus | 405/72 |
| 4,111,813 | 9/1978 | Preus | 210/924 |
| 5,165,821 | 11/1992 | Fischer et al. | 210/242.4 |

*Primary Examiner*—Ivars Cintins
*Attorney, Agent, or Firm*—Anthony J. Casella; Gerald E. Hespos

[57] ABSTRACT

A barrier assembly is provided for protecting shorelines and structures adjacent shorelines from damage attributable to oil spills. The barrier assembly includes a flexible sheet material that is impermeable to oil. One surface of the flexible sheet material may also have oil-absorbing characteristics. Each sheet has a top edge from which tie downs extend for securing sheets to structures adjacent the shoreline. Each sheet also includes a bottom edge having anchors for holding the bottom edge below the surface of the water. The sheets may include structure for connecting adjacent sheets in top-to-bottom relationship and/or in side-to-side relationship.

16 Claims, 6 Drawing Sheets

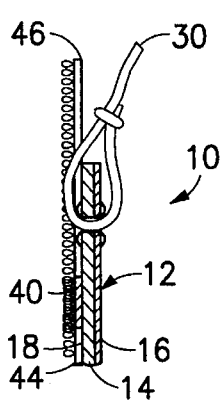
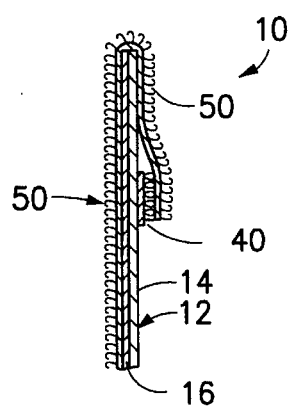
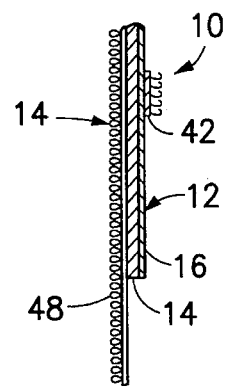
FIG. 3   FIG. 4   FIG. 5
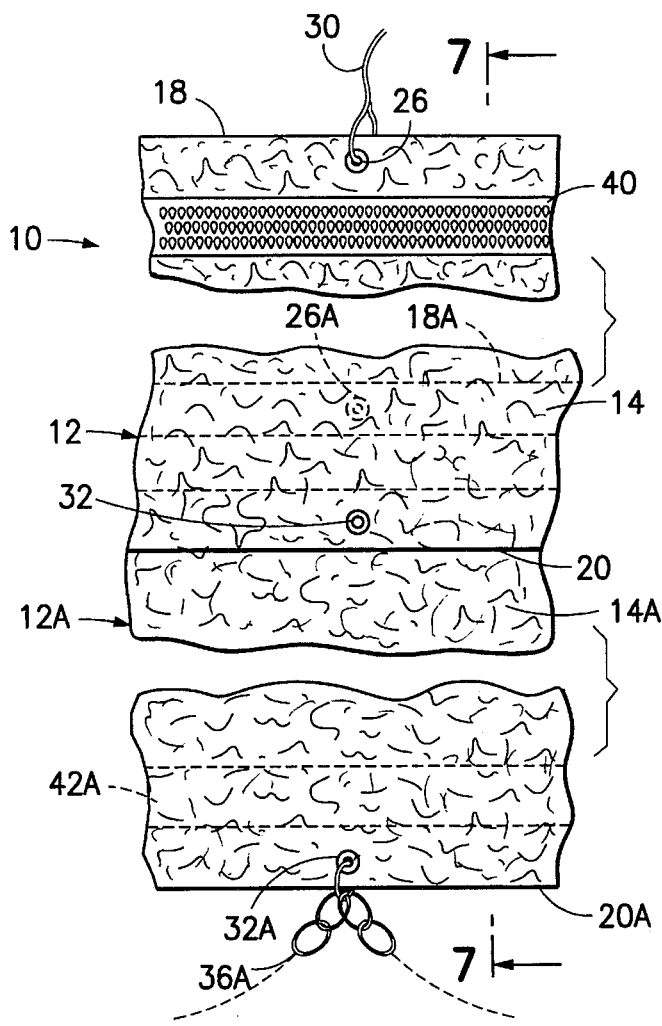
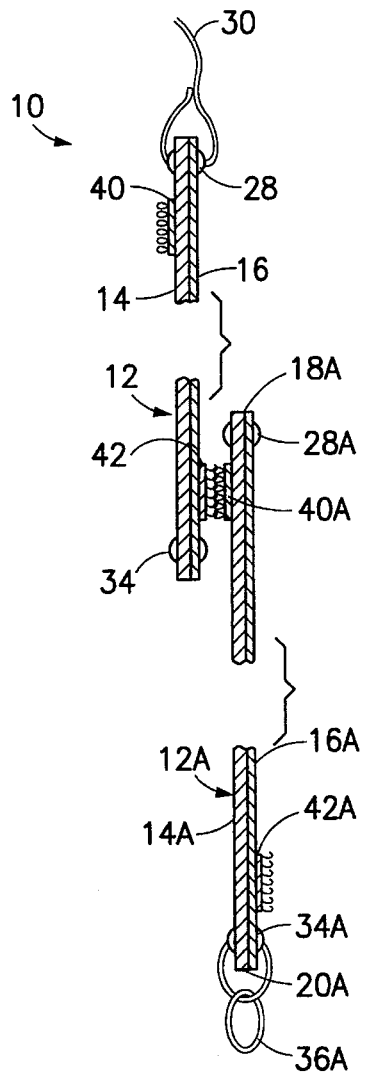
FIG. 6   FIG. 7

MODULAR SHORELINE OIL SPILL BARRIER ASSEMBLY

BACKGROUND OF THE INVENTION

1. Field of the Invention

The invention relates to a barrier for protecting shorelines, jetties, docks, boats drain pipes and other structures from damage attributable to spills of petroleum products.

2. Description of the Prior Art

Petroleum products often are transported in or near bodies of water. For example, many oil wells are drilled in open bodies of water, and the crude oil is transported by pipeline or ship to refineries adjacent the shore. Ships also are a common means for transporting petroleum products at various stages of refinement. Pipelines and oil transport ships are subject to the mercies of the sea and to the limitations of mechanical systems and human operators. News stories of oil spills with catastrophic damages are too common. The clean-up after an oil spill requires sending crews along shorelines to remove the accumulated oil. This may require scrubbing or otherwise treating docks, piers, boats and other structures that transcend the shoreline. Clean-up after even a modest oil spill can take months and can cost huge sums of money.

Communities and businesses near oil shipping ports or near oil refineries typically are aware of the potential for oil spills. Furthermore, these shoreline communities and businesses are likely to have at least several hours notice from the time an oil spill occurs until the time they are directly affected. These shoreline communities and businesses typically rely upon oil booms used by the shippers, the owners of the oil refineries or the port authority to contain the oil spill. Booms typically are elongate members that will float on water. The booms are deployed to substantially surround and contain the oil floating on the water. Pumps then are used to remove the oil from the water and deposit the removed oil into appropriate containers. Booms, however, have only limited effectiveness, particularly in situations where winds are high, water is rough or when a passing boat creates a propwash or wake. Booms also are ineffective in areas where water current flows at rates greater than 1–2 knots. Very significant portions of the oil surrounded by the booms will flow beneath the boom and escape. In the meantime, shoreline communities and businesses will have assumed that the oil spill was safely contained. Thus, the unsuspecting shoreline businesses and communities will be unprepared for the damaging oil that often escapes the properly emplaced booms. On many other occasions the oil spill will have spread too far in certain directions to be completely surrounded by booms. Shoreline businesses and communities may be made aware of the incomplete containment of the oil spill. However, they generally have few means available for protecting themselves from oil related damage. Sometimes oil may temporarily sink, only to resurface after a clean-up has been completed. Thus extensive damage may occur well after significant expenses have been incurred to remove the first wave of oil and power wash affected surfaces. Extensive damage also can occur without a catastrophic rupturing of a pipe or vessel. For example small oil spills may occur repeatedly near fueling stations or along shipping lanes. Additional oil may slowly ooze from pipe lines, ships or tanks, with considerable elapsed time before the leak can be located and stopped.

The prior art also includes non-woven fibrous plastic material that absorbs oil. Prior art non-woven fibrous plastic material may be formed into sorbent media and may be placed on oil spilled on water or on land to absorb spilled or leaking oil. The mats are periodically replaced, and the used mat with absorbed oil therein may be disposed of in an environmentally acceptable manner. Oil sorbent materials may be packaged in mats, sheets, booms, socks; particulate or pillow-like forms. For example, sorbents of polypropylene fiber may be thrown onto a floor having an oil spill or into a water-borne oil spill that has been safely contained by booms or by local geography.

The prior art further includes flexible plastic sheet materials or plastic coated materials that are substantially impermeable and chemically resistant to oil. This prior art oil-impermeable material has been used to protect structures that are particularly susceptible to damage by oil. Prior art oil-impermeable material has been laminated to the prior art oil sorbent material.

The prior art oil-impermeable plastic sheet material has been wrapped around on-shore structures near a body of water that has had an oil spill. This prior art wrapped sheet material has been held in place by conventional adhesive tape or other mechanical means in the hope of preventing or minimizing damage attributable to oil splashing from the water surface toward these wrapped on-shore structures or walkways. This wrapping and taping process is time consuming and cannot be used to protect the shoreline itself. Furthermore, many structures such as boats and the piling that supports docks or piers transcend the water line. The wrapping and taping may be effective for protecting portions of such structures above the water line. However, portions of these structures at the water line will be damaged by the oil as the water level shifts in response to waves, tides or the like.

In view of the above, it is an object of the subject invention to provide a barrier for protecting a shoreline from oil and fuel spills.

It is another object of the subject invention to provide a barrier that can protect structures adjacent a shoreline from oil and fuel spills.

A further object of the subject invention is to provide a barrier that can be deployed quickly and easily when needed to protect shorelines or adjacent structures from oil related damage.

Yet another object of the subject invention is to provide a barrier that is drapable and clingable and that can readily be adapted to various sizes and shapes of shorelines or shoreline structures that must be protected from an oil or fuel spill.

Still a further object of the subject invention is to provide a barrier that will not float on the surface of the water or the oil unless it is needed to be used in this manner.

An additional object of the subject invention is to provide a tear resistant barrier that can withstand rigors imposed by climate, tides, ultra violet radiation, water and most chemicals.

It is also an object of this invention to provide a barrier that will absorb oil even when wet.

Still another object is to provide a barrier that can readily be recovered after danger of an oil spill has passed.

A further object of this invention is to provide a barrier that can be secured by virtually any convenient attachment, such as ropes, weights, nails and staples.

SUMMARY OF THE INVENTION

The subject invention is directed to a modular barrier assembly that can be used as part of a planned preventive program for protecting shorelines, structures at or adjacent to shorelines and/or the water itself. The assembly includes at least one flexible sheet. The sheet may be formed from a material, such as plastic, that is substantially impermeable to oil. The sheet also may be formed from or comprise a material that will absorb and retain oil. The sheet may also be reinforced with a plastic netting. A preferred sheet may define at least two adjacent co-extensive layers, including a layer substantially impermeable to oil and an adjacent layer having oil absorbing characteristics. The sheet may comprise woven fibers, non-woven fibers, films, laminates, composites or the like.

The barrier assembly of the subject invention further includes attachment means for mounting the barrier assembly to an on-shore or off-shore structure near or on a body of water that could be affected by an oil spill. The attachment means may comprise, for example, tie downs extending from selected locations along an edge region of the sheet. In this regard, the sheet may be formed with apertures to which tie downs may be affixed. The tie downs may then be used to securely tie the barrier assembly to piling, dock cleats, trees or to stakes implanted in the soil specifically for the purpose of attachment to the subject barrier assembly. Holes in the sheet material for receiving the tie downs may be reinforced with grommets. Other attachment means may be used, such as straps sewn to or extending integrally from the sheets for tying the assembly to the on-shore structures. Alternatively, the attachment means may be removably engaged with cooperating attachment means on the shore, such as combinations of hooks and eyelets disposed respectively on the sheet and the on-shore structure.

The assembly of the subject invention further includes anchoring means for retaining selected portions of the sheet material below the surface of the water. The anchoring means preferably is disposed at or is connectable to portions of the sheet material opposite the portions having the attachment means. The anchoring means may comprise weights removably connectable to portions of the sheet intended to be retained below the water surface. The weights may comprise chains of appropriate mass for holding the sheet material below the surface of the water. The anchoring means may be removably connectable to sheet material by clips or ties engageable in apertures along an edge region of the sheet.

The subject barrier assembly may comprise a plurality of sheets that are releasably engageable with one another for defining a modular assembly of indeterminate dimensions. For example, each sheet may have connectors extending along a plurality of side edges. The connectors on an edge of one sheet may be releasably engaged with the connectors along an edge of another sheet. The connectors may comprise mateable strips of VELCRO material. However, snaps, clips or the like may be used in place of VELCRO. In other embodiments, sheets may be permanently connected by sewing.

In one embodiment, the sheets are rectangular. The attachment means may be disposed along a top edge of each rectangular sheet, and the anchoring means may be disposed along the opposite or bottom edge of each sheet. Connectors may be disposed along the parallel side edges of the rectangular sheets, such that a plurality of sheets may be sequentially connected to one another in side-to-side relationship. In this embodiment, polypropylene rope or other such attachment means may be connected to the respective top edges of the connected sheets for removably securing the connected sheets to appropriate on-shore structures. The anchoring means may be removably attached to selected locations along the aligned bottom edges of the interconnected sheets for holding the bottom edges of the interconnected sheets below the surface of the water. In this embodiment, the top to bottom distance of each sheet may be any convenient height (e.g., 3, 6, 10 or 20 ft.). Sheets of this dimension can be conveniently folded or rolled and carried quickly to the place of emplacement. The sheets may be connected to one another in sequential side-to-side relationship at the site to be protected. Polypropylene ropes, or other such mounting means, may be clipped, tied or otherwise attached to apertures along the top edge and may be secured to on-shore structure such as piling, trees or the like. Alternatively, the sheets may be stapled or nailed to the structure being protected. Anchoring means may be clipped to apertures along the interconnected bottom edges and may be thrown into the water. The anchoring means will then hold the bottom edges and portions of the interconnected sheets adjacent thereto below the surface of the water so that regions at the water surface that could carry oil will be safely protected by the interconnected sheets. Oil on the water surface may be absorbed into the sheet material or deflected off the sheet material to be contained and removed by other means. The sheets may then be power washed during the final stages of the clean-up. It will be appreciated that the barrier prevents having to power wash every crack and crevice of the surfaces being protected. The assembly of sheets, anchors and mounting means may then be removed from the water and disposed of in an environmentally acceptable manner.

In an alternate embodiment, as explained and illustrated further below, each sheet may have attachment means extending along all sides. The attachment means along all sides may then permit the sheets to be interconnected in both side-to-side relationship and in top-to-bottom relationship relative to one another. This option enables sheets of indeterminate dimensions to be assembled in the field. This feature may be particularly desirable in locations where the on-shore mounting structures are a considerable distance from the shoreline or where tides may cause a considerable variation of the water level. The assembly and emplacement of this embodiment will be substantially as described above.

BRIEF DESCRIPTION OF THE DRAWINGS

FIG. 3 is a cross-sectional view taken along line 3—3 in FIG. 1.

FIG. 4 is a cross-sectional view taken along line 4—4 in FIG. 1.

FIG. 5 is a cross-sectional view taken along line 5—5 in FIG. 1.

FIG. 6 is a top plan view showing portions of two sheets of a modular barrier assembly connected in top-to-bottom relationship.

FIG. 7 is a cross-sectional view taken along line 7—7 in FIG. 6.

DESCRIPTION OF THE PREFERRED EMBODIMENTS

Figure 1:
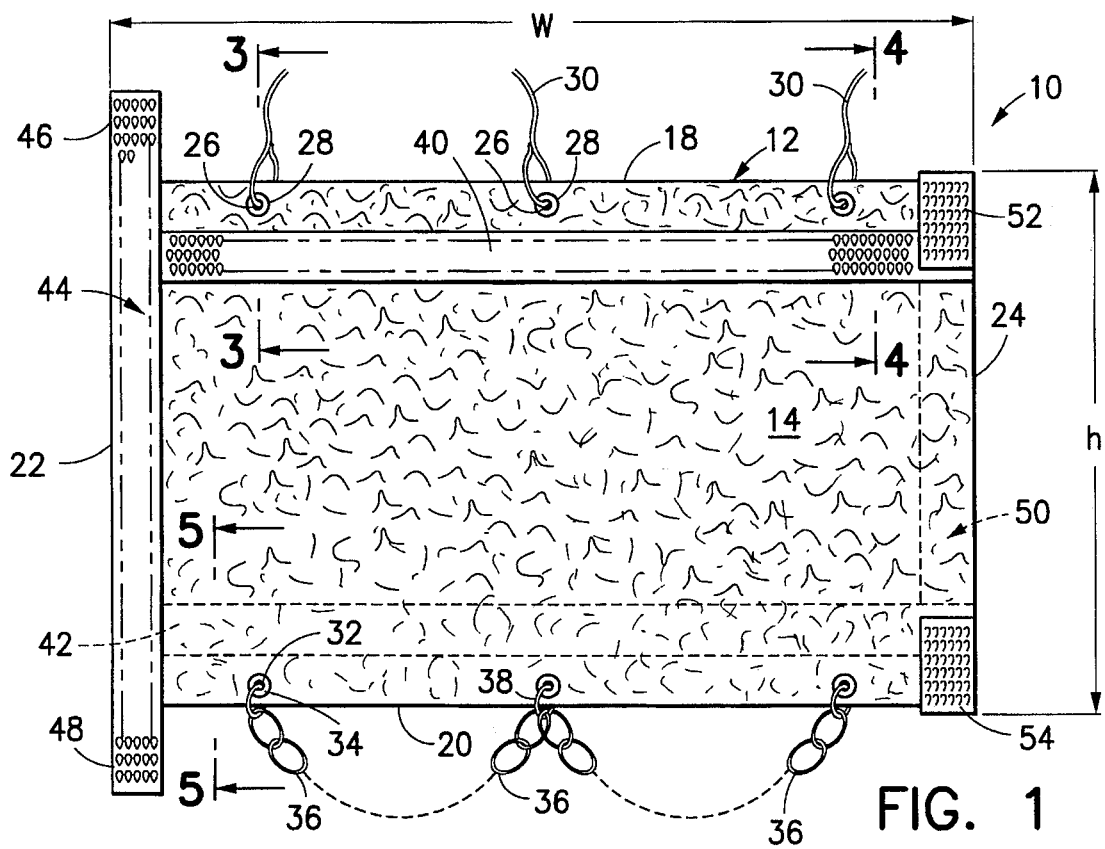
FIG. 1 is a top plan view of a modular barrier assembly in accordance with the subject invention.

A modular barrier assembly in accordance with the subject invention is identified generally by the numeral 10 in FIGS. 1—5. The modular barrier assembly 10 includes a flexible sheet 12 having a front surface 14 shown most clearly in FIG. 1 and a rear surface 16 shown most clearly in FIG. 2. The front surface 14 of the sheet 12 defines a non-woven array of polypropylene fibers needle punched to define an integral fabric. The fabric could, however, be woven. The non-woven fabric of needle punched polypropylene is oleophilic, hydrophilic, static resistant and UV resistant. Other materials that exhibit similar characteristics could be used in place of polypropylene. The fibers forming the non-woven fabric on the front surface 14 of the sheet 12 preferably are approximately four inches long and define diameters of approximately 25 microns. The fabric preferably is formed to a weight of approximately 7 oz./yd.$^2$.

The rear surface 16 of the sheet 12 is an extrusion coated polypropylene barrier film applied to the non-woven fabric defining the front surface 13. The overall thickness of the sheet 12, including the non-woven fabric and the film, preferably is approximately 60 mils.

The sheet 12 is formed to define a top edge 18, a bottom edge 20 and opposed first and second side edges 22 and 24. Length and width dimensions of the sheet 12 may be selected in accordance with the intended application. Typically one of the length or width dimensions will be determined by the dimensions of the apparatus for forming the non-woven fabric of the front surface 14 of the sheet 12 and/or the extrusion coated barrier film which defines the rear surface 16. For example, the sheet 12 may be formed with a height "h" of 3–20 ft. and may be formed with a very long indeterminate width "w" (e.g., 100 ft.), such that the sheet 12 may be conveniently rolled and stored for subsequent deployment as explained further herein. Alternatively, the sheet 12 may be formed with the above referenced height "h" of approximately 3-6 ft. and may be cut to convenient widths (e.g., 8 ft.) for convenient folding and storage while still permitting fairly easy deployment.

The sheet 12 is provided with a plurality of apertures 26 punched or otherwise formed therethrough at locations spaced slightly from the top edge 18. Each aperture 26 is depicted as being reinforced by a metal grommet 28. However, depending upon the strength characteristics of the sheet material 12, the grommets 28 may be unnecessary. The apertures 26 are uniformly spaced from one another along the top edge 18 at distances of preferably about 24 inches.

Figure 2:
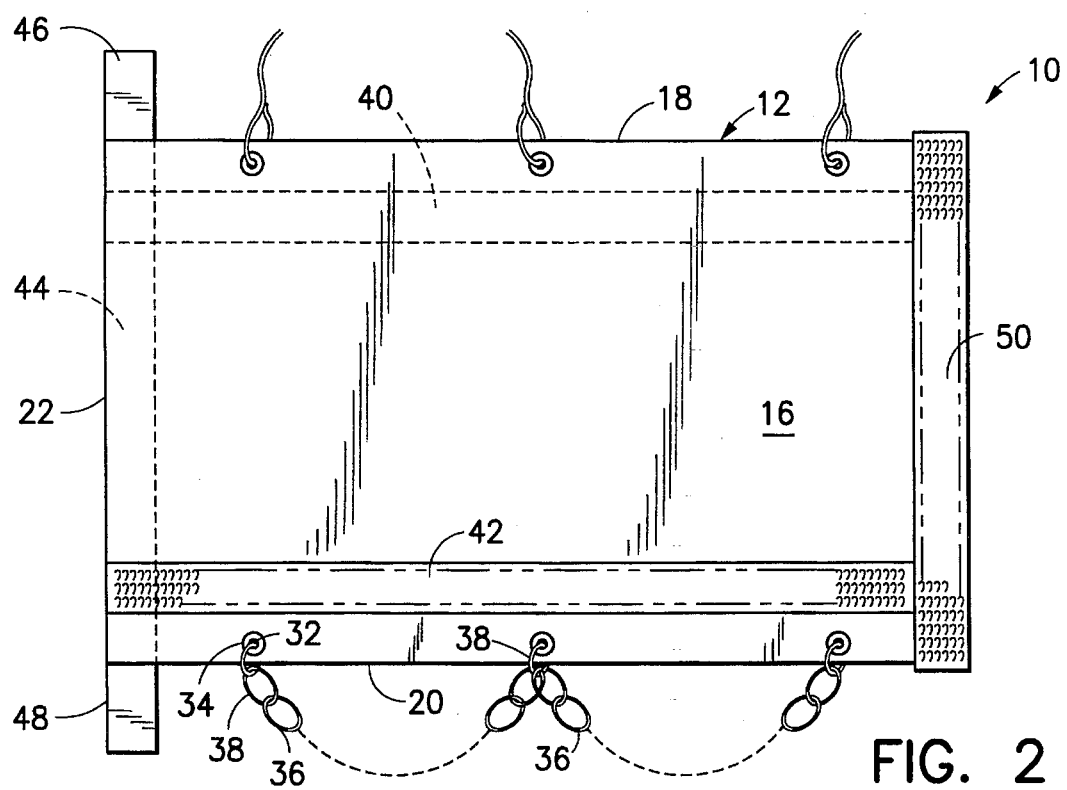
FIG. 2 is a bottom plan view of a modular barrier assembly in accordance with the subject invention.

Tie downs 30 are secured to at least selected mounting apertures 26. The tie downs 30 preferably are formed from a 0.25 inch braided polypropylene rope having a length of at least approximately 4 ft. The mounting of tie downs 30 to the sheet 12 preferably is achieved by clips that are crimped around adjacent sections of the tie down 30 that have been looped through a mounting aperture 26. As illustrated in FIGS. 1 and 2, each mounting aperture 26 along the top edge 18 of the sheet 12 is provided with a tie down 30. However, in other embodiments, fewer than all of the mounting apertures 26 may be provided with tie downs 30. In these embodiments, additional lengths of polypropylene rope may be provided to permit the deployers of the barrier assembly 10 to loop sections of rope through selected mounting apertures 26 for properly securing the sheet 12 to structure on the shore.

The sheet 12 further includes a plurality of anchoring apertures 32 passing through the sheet 12 at locations spaced slightly inwardly from the bottom edge 20. Each aperture 32 may be provided with a metal grommet 34. The barrier assembly 10 further includes anchor chains 36 extending from one anchor aperture 32 to the next in a looping arrangement. The anchor chains 36 preferably has a weight of approximately one pound per foot and provides sufficient weight to submerge lower portions of the sheet 12 below the surface of the water in the region being protected. However, the weight of approximately one pound per foot is sufficiently light to enable reasonably large sheets 12 to be handled during deployment. For larger sheets, the anchor chains 36 may be used with D-rings 38 that can be snapped opened and closed to releasably clip both an anchor aperture 32 and a looping section of anchor chain 36. This permits fairly long and lightweight sections of the sheet 12 to be deployed and attached near a shoreline with the tie downs 30. Lengths of anchor chain 36 may then be clipped to the anchor apertures 32 with D-rings 38 to complete the barrier assembly.

The barrier assembly 10 permits a plurality of sheets 12 to be interconnected to one another in side-to-side relationship and/or in top-to-bottom relationship. For these purposes, as shown most clearly in FIGS. 1–5, each sheet 12 includes connectors in proximity to the respective top and bottom edges 18 and 20 and the respective side edges 22 and 24. As noted above, the connectors can take any of a variety of forms, including snaps and alignable apertures that can be tied together. A preferred connection, however, includes mateable VELCRO strips including a strip with loops and a strip with resiliently deflectable hooks for releasably engaging the loops. In particular, each sheet 12 includes a strip of VELCRO loop fabric 40 secured to the front surface 14 parallel to and spaced slightly from the top edge 18. As shown most clearly in FIG. 1, the strip of VELCRO loop fabric 40 is disposed such that the tie down mounting apertures 26 are between the top edge 18 and the strip of VELCRO loop fabric 40. A corresponding strip of VELCRO hook fabric 42 is secured to the rear surface 16 of the sheet 12 generally parallel to and spaced slightly from the bottom edge 20. As shown most clearly in FIG. 2, the strip of VELCRO hook fabric 42 is disposed such that the anchor mounting apertures 32 are between the bottom edge 20 and the strip of VELCRO hook fabric 42.

Each sheet 12 further includes a strip of VELCRO loop fabric 44 on the front surface 14 extending adjacent the first side edge 22 and including top and bottom flaps 46 and 48 which project beyond the top and bottom edges 18 and 20 respectively. Each sheet 12 further includes a strip of VELCRO hook attachment 50 secured on the rear surface 16 adjacent the second side edge 24. The strip 50 includes extension tabs 52 and 54 respectively that are folded over the respective top and bottom edges 18 and 20 and are secure to portions of the front face 14 near the respective top and bottom edges 18 and 20

Adjacent sheets 12 and 12A are shown connected in top-to-bottom relationship in FIGS. 6 and 7 respectively. This interconnection is achieved by merely placing portions of the sheet 12 adjacent the bottom edge 20 over portions of the sheet 12A adjacent the top edge 18A thereof such that the strip of VELCRO hook attachments 42 secured to the rear surface 16 of the sheet 12 engages the strip of VELCRO loop attachments 40A on the front surface 14A near the top edge 18A of the sheet 12A. With this arrangement, portions of the upper sheet 12 adjacent the bottom edge 20 thereof are effectively layered over portions of the lower sheets 12A adjacent the top edge 18A thereof. The respective apertures 32 and 26A are covered to prevent or minimize seepage of oil therethrough. In this interconnected state, the anchoring apertures 32 of the sheet 12 do not have anchor chains 36 mounted thereto and the tie down apertures 26A of the sheet 12A do not require the tie downs to be secured thereto. However, the upper sheet 12 in such an interconnected array will have tie downs 30 secured in the tie down apertures 26 thereof and the lower sheet 12A in such an interconnected array will have anchor chains 36A secured to the anchor apertures 32A thereof.

Figure 8:
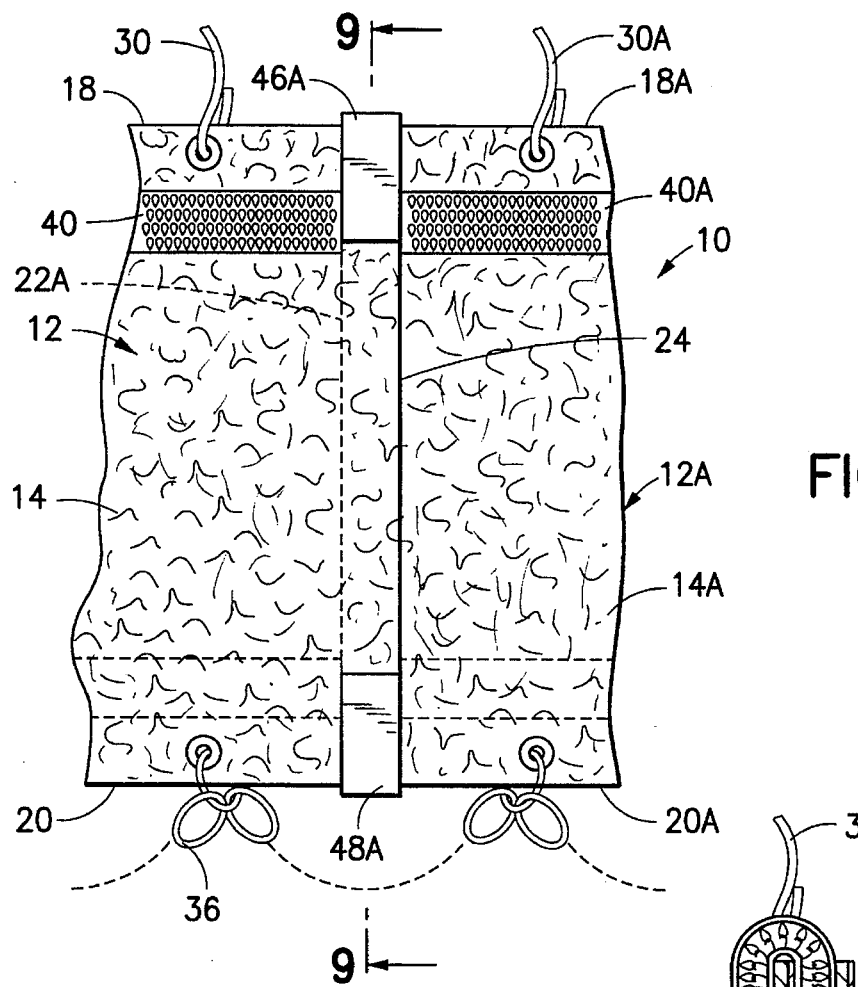
FIG. 8 is a top plan view showing a portion of two sheets of a modular barrier assembly connected in side-to-side relationship.
Figure 9:
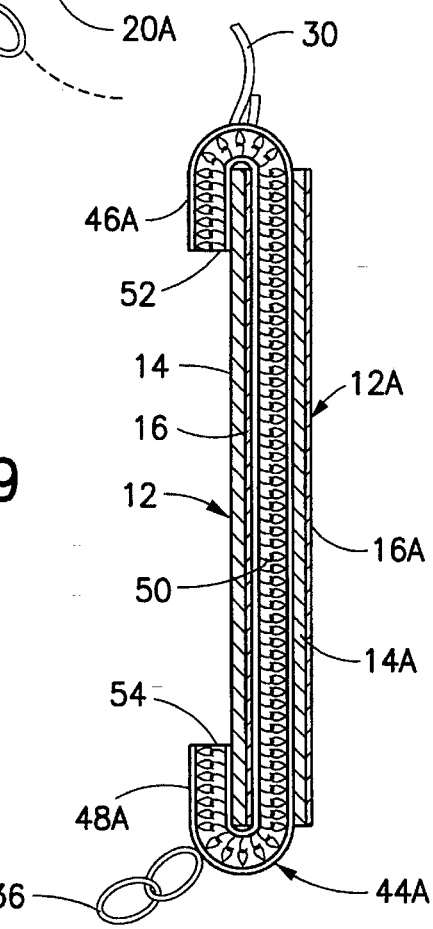
FIG. 9 is a cross-sectional view taken along line 9—9 in FIG. 8.

The sheets 12 and 12A also may be interconnected in side-to-side relationship as shown in FIGS. 8 and 9 respectively. This side-to-side engagement is achieved by merely placing the strip of VELCRO hooks 50 on the rear surface 16 adjacent the second side 24 of the sheet 12 onto the strip of VELCRO loops 44A on the front surface 14A adjacent the side 22A of the sheet 12A. Attachment is rendered redundant and more secure by then folding the VELCRO loop flaps 46A and 48A over the VELCRO hook tabs 52 and 54 on the front surface 14 of the sheet 12. It will be appreciated that various side-to-side and top-to-bottom combinations of sheets 12, 12A and so forth can be carried out in the manner shown in FIGS. 6-9.

Figure 10:
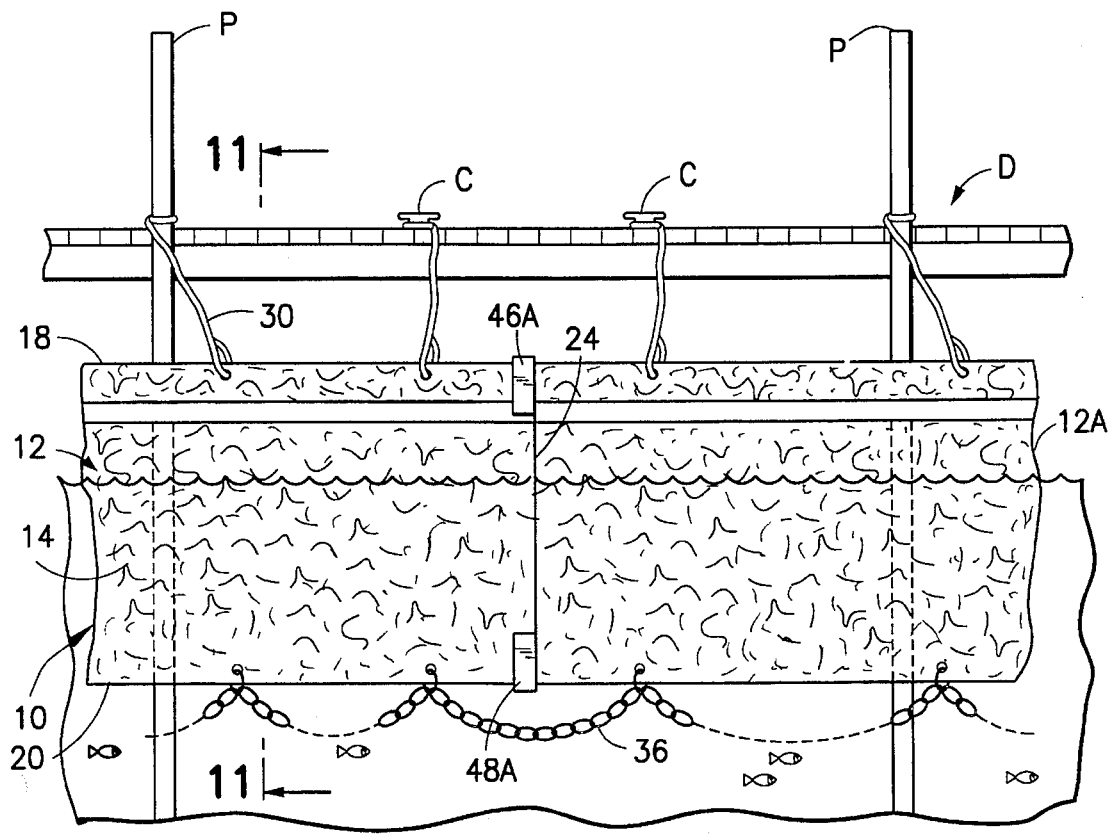
FIG. 10 is a schematic front elevational view of a modular barrier assembly mounted to piling of a dock.
Figure 11:
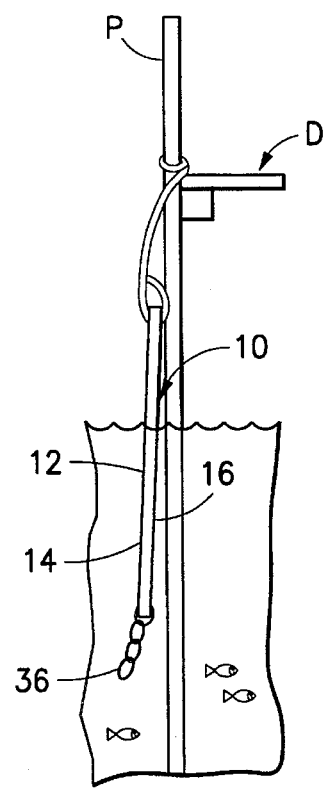
FIG. 11 is a side elevational view of the assembly shown in FIG. 10.

Barrier assembly 10 can be deployed to protect any of a plurality of different shoreline structures. For example, FIGS. 10 and 11 schematically show a barrier assembly 10 secured to a dock D supported by a plurality of piling members P. This attachment is achieved by merely securing the tie downs 30 around upper sections of piling members P and/or around any dock cleats C that may be present. If necessary, additional tie downs 30 may be looped through any tie down apertures 26 that do not have tie downs 30 pre-installed thereon. Anchor chains 36 are then clipped into secure engagement with anchor apertures 32 using D-rings 38. The barrier assembly is then dropped from the top surface of the dock D such that the anchor chains 36 securely hold the sheet 12 below the surface of the water W. Any oil that may be floating on the surface of the water will be prevented from passing into direct contact with the piling P by the polypropylene rear surface 16 of the sheet 12. Additionally, the non-woven polypropylene fibrous front surface 14 of the sheet 12 will absorb some of the oil that may be present on the surface of the water. In many instances it has been found preferable to have the absorbent front surface 14 face the dock D and piling P. With this installation, the polypropylene rear surface 16 will repel the oil, while the fibrous front surface 14 will provide abrassion resistance and clingability to the structure and will absorb any oil that happens to get behind the barrier 10. Additional oil containing and absorbing structures as referred to above may then be employed to absorb oil on the surface and/or pumps may be used to remove oil from the surface. After complete removal of the oil from the water, the barrier assembly 10 may be power washed and/or may be removed from the protected dock D, and may be disposed of in an environmentally acceptable manner.

Figure 12:
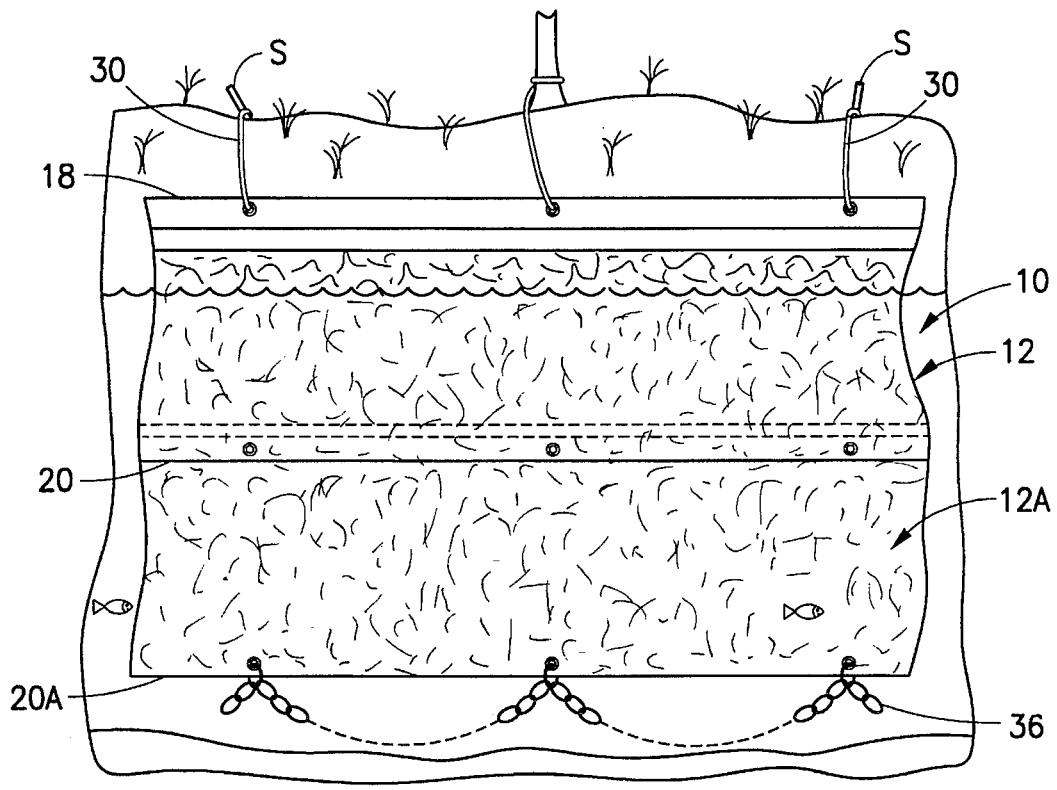
FIG. 12 is a schematic front elevational view of a modular barrier assembly mounted to a section of shoreline.
Figure 13:
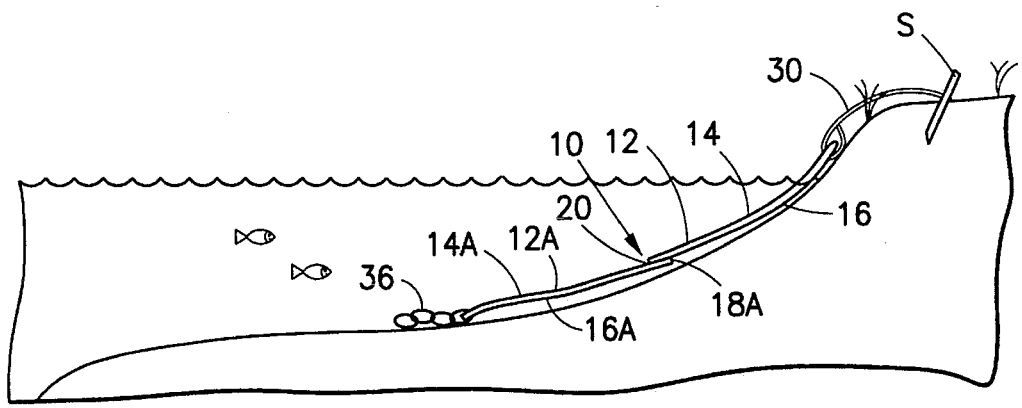
FIG. 13 is a cross-sectional view taken along line 13—13 in FIG. 12.

FIGS. 12 and 13 show the barrier assembly 10 deployed to protect a shoreline without man made structures. In this instance, the tie downs 30 are secured to supports S which may be trees or stakes driven into the ground surface adjacent the shoreline. Anchor chains 36 are then secured to anchor apertures 32 near the bottom edge 20 of each sheet 12 and the barrier assembly is then tossed into the water. The anchor chains 36 function to keep the bottom edge 20 of the sheet 12 submerged beneath the surface of the water. Thus, the polypropylene film defining the rear surface 16 of the sheet 12 will prevent oil from reaching rocks or other natural shore structures at the waters edge. Simultaneous, the non-woven polypropylene fibrous front surface 14 will absorb at least portions of the oil carried by the surface of the water. As noted above, it is often preferable to have the polypropylene film layer 16 face upwardly to repel oil, and to have the fibrous layer 14 face downwardly to absorb the oil that may get past the barrier 10. As noted above, other available oil recovery techniques and apparatus may be employed to remove the floating oil while the shoreline is being protected by the barrier 10. The barrier 10 may then be easily removed and disposed of in an environmentally acceptable manner.

FIGS. 10-13 each depicted a single sheet performing the barrier function. It is to be understood, however, that a plurality of such sheets 12 may be interconnected in top-to-bottom relationship as depicted in FIGS. 6 and 7 above and/or in side-to-side relationship as depicted in FIGS. 8 and 9 above. The top-to-bottom interconnection of sheets 12 typically will be carried out to ensure a sufficient range of protection consistent with variations of water level due to tide changes and wave actions. The side-to-side connections typically will be carried out to ensure adequate extent of coverage around structures and along shorelines.

Figure 14:
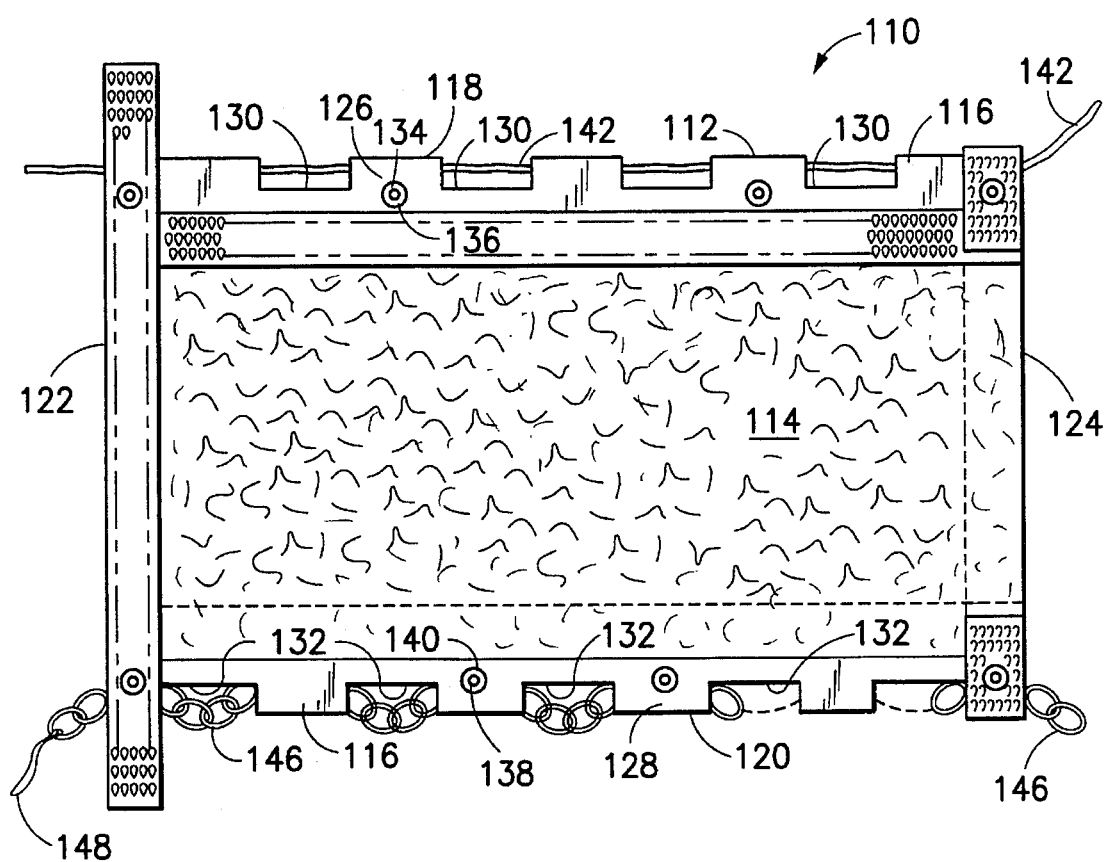
FIG. 14 is a top plan view similar to FIG. 1, but showing an alternate barrier assembly.

FIG. 14 shows an alternate barrier assembly 110 that is functionally similar to the barrier assembly 10 described and illustrated above. In particular, the barrier assembly 110 includes a sheet 112 which includes at least an oil-impermeable layer 116 and which further includes an oil sorbent layer 114. The sheet 112 illustrated in FIG. 14 is of generally rectangular shape and includes opposed top and bottom edges 118 and 120 and opposed side edges 122 and 124. As with the previous embodiment, the height and width dimensions of the sheet 112 may be any convenient dimensions in accordance with the intended application.

The sheet 112 differs from the sheet 12 described and illustrated above in that the top and bottom edges 118 and 120 respectively define hems 126 and 128. The hems are secured in folded relationship with remaining portions of the sheet 112 by sewing, and define an elongate pocket along the respective top and bottom edges. Top and bottom notches 130 and 132 respectively are cut into the respective top and bottom hems 126 and 128 at selected convenient intervals. The notches 130 and 132 all are of the same width, and the spacing between each pair of adjacent notches is equal to the notch width. Additionally, the top notches 130 are disposed to align with portions of the bottom hem 128 between adjacent bottom notches 132. Thus, two sheets 112 can be arranged in top to bottom relationship such that the respective top and bottom notches 130 and 132 of the sheets can be interdigitated with one another. A rope then can be advanced through the aligned hem sections to hold the sheets in top to bottom relationship for effectively increasing the height. Tie down apertures 134 are formed through the hem at locations intermediate the top notches 130. The apertures are further provided with metal grommets 136 which function to reinforce the tie down apertures 134 and which also function to reinforce the top hem 126. In a similar manner, bottom apertures 138 are formed through the bottom hem, and are reinforced by metal grommets 140.

A rope 142 may be urged entirely through the top hem 126 to enable the barrier assembly 112 to be tied down to an appropriate structure or surface to be protected. The rope 142 may be pre-installed by the manufacturer or may conveniently be snaked through the hem 126 from one top notch 130 to the next by the installer in the field. In many situations, the installer may not want the rope 142 to extend entirely through the hem. In these situations, the installer may insert the rope 142 into the hem 126 at one top notch 130, and may withdraw the rope 142 from the hem 126 at the adjacent top notch 130. Tie down apertures 134 may be used in place of or to supplement the tie down functions enabled by the rope 142 passing through the top hem 126.

The bottom hem 128 may be used to receive a chain 146 which may pass entirely therethrough or which may be looped through short sections of the hem 128 from one notch 132 to an adjacent notch. Pre-installation of the chain 146 will add significantly to the pre-installation weight of the barrier assembly 110, and therefore may make deployment more difficult. To facilitate the deployment, the barrier assembly 110 preferably is provided with a guide rope 148 passing through the bottom hem 128. The installer may tie a chain onto an exposed end of the guide rope, and may then pull the guide rope to urge the chain a selected distance through the bottom hem 128. Upon achieving the selected length of insertion, the installer may merely disconnect the guide rope 148 from the chain at the appropriate notch 132. A new length of chain may then be connected to the guide rope 148 and pulled through a selected number of bottom hem sections 128 between the respective bottom notches 132.

The illustrated embodiments all depict chains to perform the anchoring function. It will be appreciated, however, that other weighted structures may be employed in place of chains. For example, in the embodiment illustrated in FIG. 14, the long continuous bottom hem 128 may be interrupted by short sections of stitching extending in a top to bottom direction adjacent selected notches 132. Thus, the bottom hem 128 will effectively be divided into pockets. Long generally tubular weights may then be inserted into the respective pockets.

The barrier assembly 110 illustrated in FIG. 14 further includes attachment means adjacent the side edges 122 and 124 and attachment means in proximity to the top and bottom hems 126 and 128 respectively. The attachment means may be identical to those described and illustrated above and are used for the same function. Additionally, the entire barrier assembly 110 depicted in FIG. 14 may be deployed for protecting shoreline structure substantially in the manner described above. In this regard, the fibrous layer 114 may face either away from the structure being protected or toward the structure being protected. The oil-impermeable layer 116 faces in the opposite direction and prevents oil from reaching the structure being protected.

While the invention has been described with respect to certain preferred embodiments, it is apparent that various changes can be made without departing from the scope of the invention as defined by the appended claims. For example, other interconnection means between adjacent sheets may be used. Similarly, other tie down structures can be employed, and other anchor structures can be used. These and other variations will be apparent to persons skilled in the art after having read the subject disclosure.

We claim:

1. A barrier assembly for protecting structures that are partly submerged in water from oil spills floating on the water, said barrier assembly comprising: at least one substantially rectangular sheet of flexible material comprising a first layer of oil-impermeable material and a second layer defining an integral fabric coextensive with and secured to said first layer, said integral fabric of said second layer being oleophilic and hydrophilic, said rectangular sheet having opposed top and bottom edges and opposed side edges, portions of said sheet adjacent said top and bottom edges being folded and secured to adjacent portions of said sheet to define top and bottom hems defining elongate pockets, said top and bottom hems each being formed respectively with a plurality of top and bottom notches providing access to the elongate pockets defined by the respective top and bottom hems, a tie down rope threaded through the elongate pocket defined by said top hem from one said notch in said top hem to the notches adjacent thereto, such that said rope is accessible at said notches along said top edge for securely attaching said sheet to said structure above the water, said bottom edge of said sheet having anchoring means for submerging portions of said sheet adjacent said bottom edge below the water.

2. The barrier assembly of claim 1, wherein said oil-impermeable material is a polypropylene film.

3. The barrier assembly of claim 1 wherein the sheet of flexible material includes a reinforcing netting laminated to said oil-impermeable material.

4. The barrier assembly of claim 1, wherein said second layer comprises a non-woven array of fibers.

5. The barrier assembly of claim 1, wherein the attachment means further comprises a plurality of tie down apertures through said sheet in proximity to said top edge and a plurality of tie downs secured to said sheet at said tie down apertures and extending therefrom for releasably attaching said sheet to said structure above the water at the shoreline.

6. The barrier assembly of claim 5, wherein the tie down apertures are reinforced by metal grommets.

7. The barrier assembly of claim 1, wherein said anchoring means comprise a plurality of anchoring apertures extending through said sheet in proximity to said bottom edge thereof, a plurality of anchors secured to portions of said sheet adjacent said anchoring apertures.

8. The barrier assembly of claim 7, wherein the anchors comprise anchor chains looping from one said anchoring aperture to another on said sheet.

9. The barrier assembly of claim 8, further comprising clip means for releasably connecting said anchor chain to said anchoring apertures along said bottom edge of said sheet.

10. The barrier assembly of claim 1, wherein the anchoring means comprises at least one chain dimensioned for insertion into the bottom hem.

11. The barrier assembly of claim 1, wherein said sheet includes opposed first and second surfaces, said first surface of said sheet including first connectors extending therealong generally parallel to and in proximity to said top edge, said second surface of said sheet including an array of second connectors extending therealong generally parallel to and in proximity to said bottom edge, said second connectors in proximity to said bottom edge being releasably connectable to the first connectors in proximity to said top edge, such that a plurality of said sheets are connectable in top-to-bottom partially overlapped relationship with one another.

12. The barrier assembly of claim 11, wherein the connectors adjacent said top and bottom edges of said sheet are strips of material, one of said strips of material comprising an array of loops, and the other of said strips of material comprising an array of resiliently deflectable hooks releasably engageable with said loops.

13. The barrier assembly of claim 1, wherein said sheet includes opposed first and second surfaces and opposed first and second side edges extending between the respective top and bottom edges, said barrier assembly including an array of connectors secured to said first surface of said sheet adjacent said first side edge thereof and an array of connectors secured to said second surface of said sheet adjacent said second side edge thereof, said connectors adjacent said first side edge being releasably connectable to said connectors along said second side edge thereof such that a plurality of said sheets are releasably connectable in side-to-side partly overlapped relationship with one another.

14. The barrier assembly of claim 13, wherein said array of connectors along said side edges comprise strips of fabric connectors, one said strip comprising an array of loops, and the other said strip comprising an array of resiliently deflectable hooks releasably engageable with said loops.

15. The barrier assembly of claim 14, wherein the strip secured to said second surface of said sheet and along said second edge includes extensions folded over said top and bottom edges and secured to regions of said front surface adjacent said top and bottom edges, and wherein the strip secured to said first surface and along said first edge includes flaps projecting beyond said top and bottom edges, said flaps being foldable into engagement with the extensions of the second said strip for redundantly securing two said sheets in side-to-side relationship with one another.

16. The barrier assembly of claim 1, further comprising a guide rope extending through said bottom hem, said guide rope having a connecting end, said anchoring means comprising a chain releasably connectable to said guide rope, whereby said guide rope selectively pulls said chain through said bottom hem prior to use of said barrier assembly.

* * * * *